United States Patent
Yu et al.

(10) Patent No.: US 9,481,352 B2
(45) Date of Patent: *Nov. 1, 2016

(54) WHEEL TORQUE DISTURBANCE SUPPRESSION CONTROL FOR VEHICLE HOLD BEFORE/DURING ENGINE STARTUP

(71) Applicant: FORD GLOBAL TECHNOLOGIES, LLC, Dearborn, MI (US)

(72) Inventors: Hai Yu, Canton, MI (US); Mathew Alan Boesch, Plymouth, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,208

(22) Filed: Nov. 11, 2013

(65) Prior Publication Data

US 2014/0067224 A1    Mar. 6, 2014

Related U.S. Application Data

(63) Continuation of application No. 12/949,068, filed on Nov. 18, 2010, now Pat. No. 8,579,765.

(60) Provisional application No. 61/267,983, filed on Dec. 9, 2009.

(51) Int. Cl.
| | |
|---|---|
| *B60W 10/188* | (2012.01) |
| *B60W 10/06* | (2006.01) |
| *B60W 10/184* | (2012.01) |
| *B60W 30/18* | (2012.01) |

(52) U.S. Cl.
CPC ............ *B60W 10/06* (2013.01); *B60W 10/184* (2013.01); *B60W 10/188* (2013.01); *B60W 30/18027* (2013.01); *B60W 30/18118* (2013.01); *B60W 2510/0638* (2013.01); *B60W 2540/12* (2013.01); *Y10T 477/813* (2015.01); *Y10T 477/814* (2015.01)

(58) Field of Classification Search
None
See application file for complete search history.

(56) References Cited

U.S. PATENT DOCUMENTS

| | | | |
|---|---|---|---|
| 6,364,436 B1 * | 4/2002 | Sawada | B60T 7/042 188/353 |
| 7,000,998 B2 | 2/2006 | Hano et al. | |
| 7,166,060 B2 | 1/2007 | Jlang et al. | |
| 7,480,545 B2 | 1/2009 | Braeuer et al. | |
| 7,516,007 B2 | 4/2009 | Tamai et al. | |
| 2003/0137192 A1 | 7/2003 | Hano et al. | |
| 2006/0111823 A1 * | 5/2006 | Tamai | B60W 10/06 701/38 |
| 2006/0160659 A1 | 7/2006 | Jlang et al. | |
| 2006/0224277 A1 | 10/2006 | Braeuer et al. | |
| 2007/0054773 A1 * | 3/2007 | Braun et al. | 477/4 |
| 2008/0026913 A1 | 1/2008 | Nakamoto et al. | |
| 2008/0262691 A1 | 10/2008 | Ludwig et al. | |

FOREIGN PATENT DOCUMENTS

| | | |
|---|---|---|
| CN | 1935571 A | 3/2007 |
| DE | 102004026722 | 10/2005 |

* cited by examiner

*Primary Examiner* — Erin D Bishop
(74) *Attorney, Agent, or Firm* — David B. Kelley; Brooks Kushman P.C.

(57) ABSTRACT

A vehicle-hold control method is used to hold an engine-powered vehicle from rolling backward on a road gradient during an engine start. The engine shuts down when the vehicle is stopped following operation of the vehicle under engine power. The engine is re-started during an engine cranking interval as vehicle wheel brakes are applied. The brakes are released in response to detection of pre-calibrated engine speed characteristics.

4 Claims, 5 Drawing Sheets

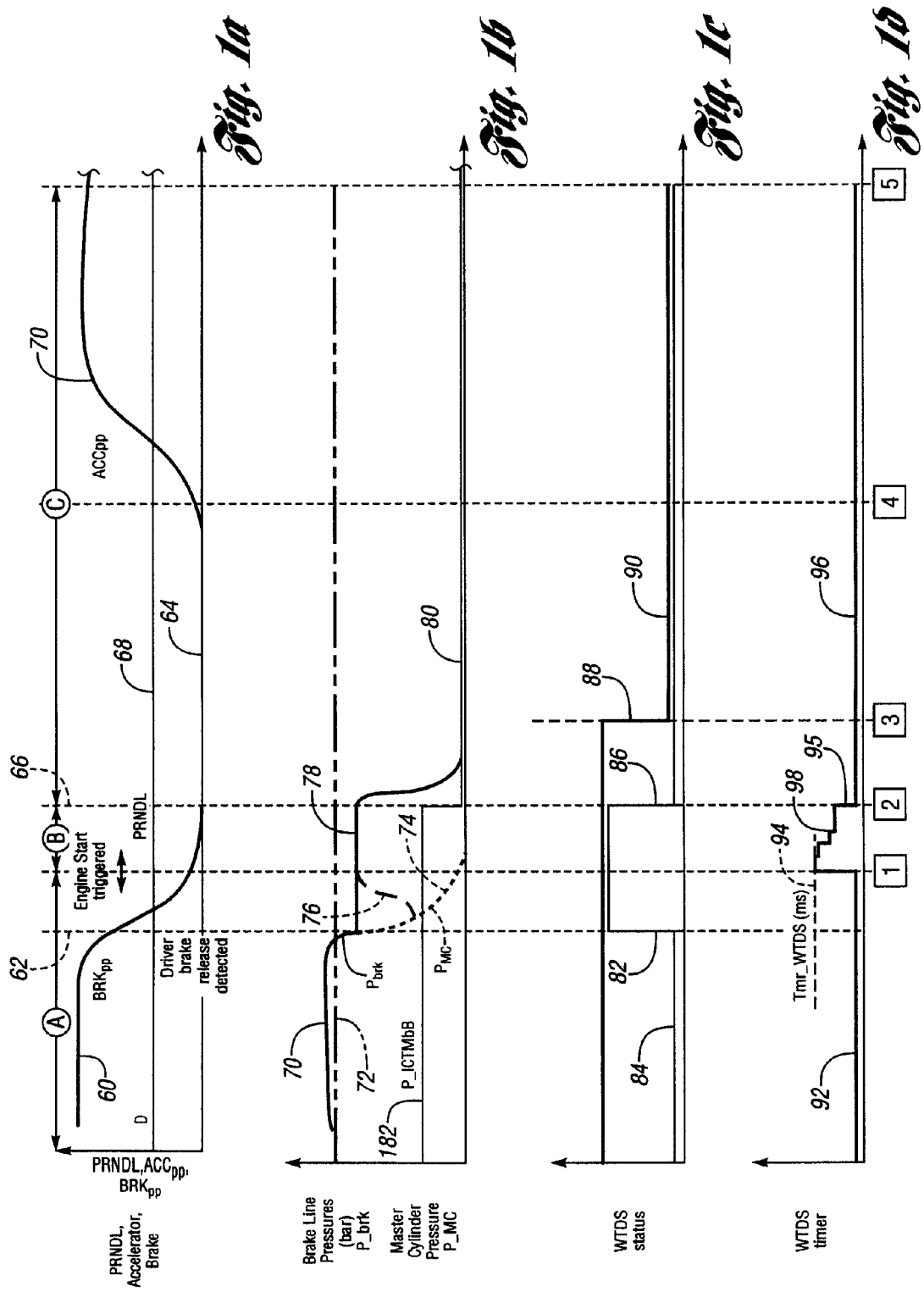

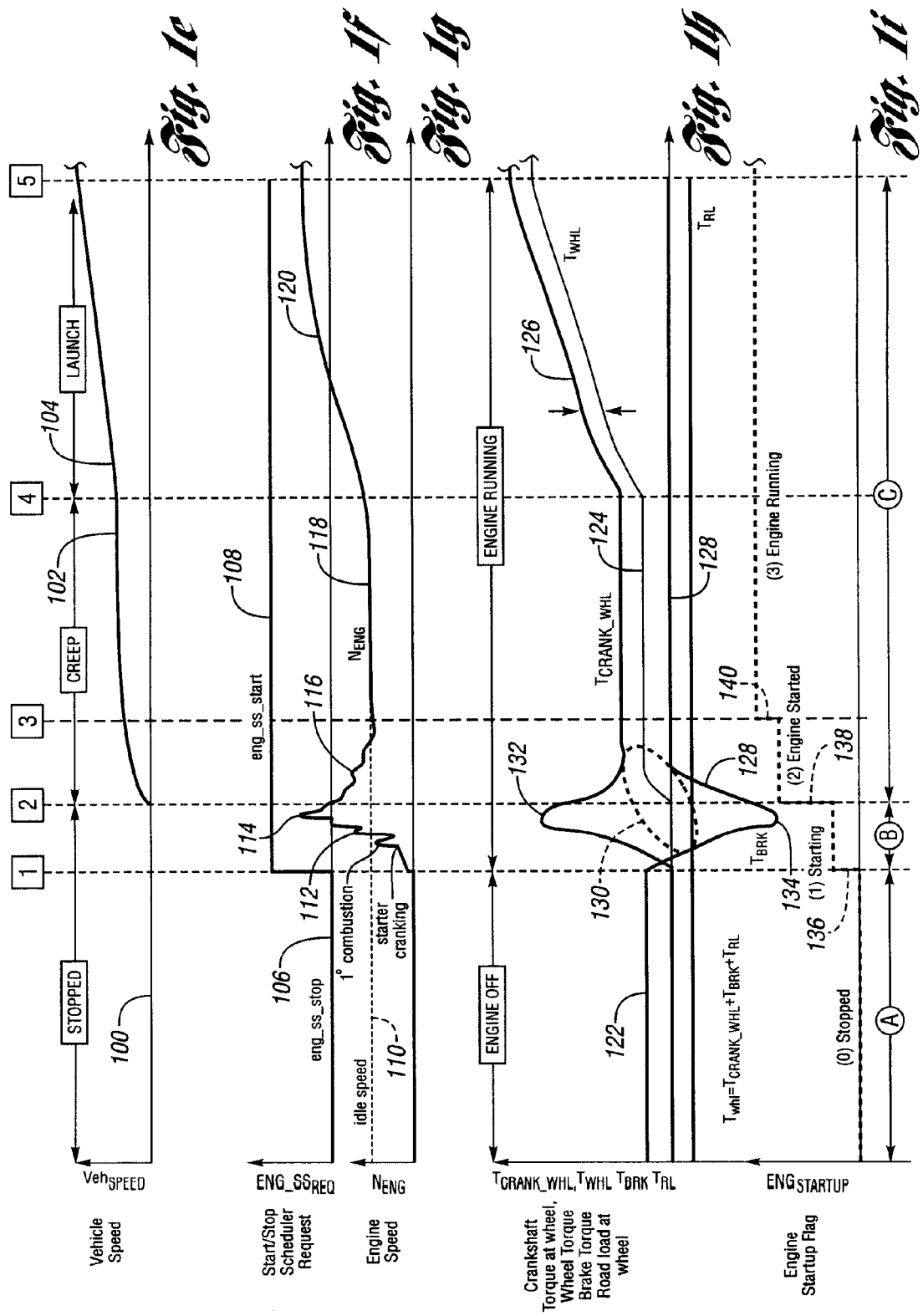

WHEEL TORQUE DISTURBANCE SUPPRESSION CONTROL FOR VEHICLE HOLD BEFORE/DURING ENGINE STARTUP

CROSS-REFERENCE TO RELATED APPLICATIONS

This application is a continuation of U.S. application Ser. No. 12/949,068 filed Nov. 18, 2010, now U.S. Pat. No. 8,579,765, which, in turn, claims the benefit of U.S. provisional application Ser. No. 61/267,983 filed Dec. 9, 2009, the disclosures of which are hereby incorporated in their entirety by reference herein.

BACKGROUND

During travel of an engine-powered vehicle, there are many instances when the vehicle must stop before a destination is reached. This may occur, for example, when the vehicle stops at traffic signals, cross-walks, stop signs and the like. A so-called micro-hybrid vehicle may enable a stop/start strategy for starting and stopping the vehicle engine during a driving event. The engine is shut down if no power is required (e.g. while waiting at a traffic light). As soon as power is requested, the engine is automatically restarted. By avoiding unnecessary engine idling, the vehicle's fuel economy will be improved. For this reason, it is desirable to use the engine shut down function as much as possible when certain engine stop conditions are satisfied.

For a conventional vehicle launch on a hill, a hill-start brake hold function, using a driver-activated brake, may be used to help the driver launch the vehicle on an uphill gradient by preventing the vehicle from rolling backward. The brake hold function is usually activated when the estimated road gradient is higher than a calibrated threshold level; for example about 7% for vehicles with automatic torque converter transmissions. Below this threshold, powertrain creep torque is sufficient to counteract a negative road gradient load on the vehicle such that the vehicle begins to move forward once the driver actuated brake is released.

In the following description, a 7% gradient threshold will be used in describing an example embodiment without loss of generality.

Vehicle torque at zero accelerator pedal input is:

$T_{Veh} = T_{PT} + T_{Brk} - T_{Rl}$, where $T_{Brk}$ is brake torque, $T_{PT}$ is the powertrain torque at wheels and $T_{PT} = T_{Creep}$ when the vehicle is idling. $T_{Creep}$ is creep torque and $T_{Rl}$ is road load due to gravity.

Brake torque at vehicle standstill is:

$T_{Brk} = T_{Rl} - T_{Creep}$ (assuming sufficient brake pressure input)

Gross torque on the vehicle at vehicle standstill is:

$T_{Veh} = 0$

Gross torque on vehicle during vehicle launch after brake release is:

$T_{Veh} = T_{PT} - T_{Rl}$ and before pressing accelerator pedal:

$T_{Veh} = T_{Creep} - T_{Rl}$ $T_{Creep} - T_{Rl} > 0$ when the road gradient is less than say 7%.

$T_{Creep} - T_{Rl} < 0$ when the road gradient is larger than 7%.

In contrast to a conventional vehicle, a micro-hybrid electric vehicle enables an engine stop-start function at vehicle standstill. It is possible for the vehicle to roll backward downhill after brake release and before the engine is started, where $T_{PT} = 0$, even if the gradient is less than 7% (it is assumed here that the brake hold function will take care of the hill start assistance for gradients higher than 7%). The backward roll is due to the absence of powertrain creep torque during engine stop.

Gross torque on vehicle during launch after brake release, but before engine start, is:

$T_{Veh} = -T_{Rl} < 0$ where $T_{Veh}$ is gross torque on the vehicle due to gravity and $-T_{Rl}$ is a negative torque component in a direction parallel to the roadway.

Such a negative torque on the vehicle may cause the vehicle to roll back and even stall the engine during its startup process. The effect of the negative torque also depends on the vehicle load condition. This is demonstrated by the following relationship:

$T_{Rl} = (M_{vehicle} + M_{payload}) g \sin(\theta)$, where $\theta$ = road slope angle corresponding to the gradient, $M_{vehicle}$ = mass of the vehicle, and $M_{payload}$ = vehicle payload mass.

The heavier the vehicle is loaded ($M_{payload}$), the higher the negative torque on the vehicle.

It is desirable to hold a micro-hybrid vehicle at a standstill before the engine startup regardless of external conditions. One solution to this problem is to reduce the brake hold gradient threshold down to a lower gradient level, e.g. 3%, such that the vehicle launch process can be supported by the brake hold function to avoid possible vehicle rollback when there is a road gradient. However, the following problems make the use of the brake hold function unfeasible for solving the micro-hybrid vehicle launch problem in a low road gradient range for the following reasons.

1. The brake hold function depends on powertrain torque estimation to determine when to release brake pressure. When the estimated powertrain torque $\tilde{T}_{PT}$ is higher than the estimated gradient load $\tilde{T}_{Rl}$, (i.e. $T_{Veh} = T_{PT} - T_{Rl} > 0$), the brake hold will start to release brake pressure. If it is not higher, it can maintain the brake pressure close to the initial driver input level such that:

$T_{Veh} = T_{PT} + T_{Brk} - T_{Rl} = 0$, and $T_{Brk} = T_{Rl} - T_{PT} > 0$.

The problem of compensating for the negative road gradient load before the engine startup then would be solved and there will be no vehicle rollback. But, this solution will present another problem. The powertrain torque estimation is far from accurate during an engine startup process. It is only after the engine comes to a steady state that the powertrain torque estimation will converge to the true powertrain torque value. Consequently, if the estimated powertrain torque is too high, early brake pressure release will be commanded by the brake hold function, which may result in unexpected vehicle rollback motion. On the other hand, if the estimated powertrain torque is too small, the brake pressure release will be delayed. This delay will drag the vehicle launch attempt as demonstrated by the following equations:

$T_{Veh} = T_{PT} + T_{Brk} - T_{Rl} = 0$ $T_{Brk} = T_{Rl} - T_{PT} < 0$.

Such a consequence is undesirable.

2. If the vehicle is standing on a near flat surface (e.g., −3%~3%), the driver does not expect any delay in vehicle launch. However, the road gradient estimation usually does not have good accuracy, especially in a low gradient range. The road gradient estimation accuracy is also affected by environmental conditions (e.g. temperature) and gradient sensor signal quality. As a result, lowering a brake hold gradient threshold may bring a brake hold function induced vehicle launch delay in a flat ground vehicle launch, which sacrifices vehicle performance.

When the vehicle launch is in a low gradient range (e.g., –3%~7%), the powertrain creep torque is sufficient to overcome the road load torque on the vehicle as the launch of the vehicle is started. In this range of operation, the brake hold function for vehicle launch assistance is expected to be terminated once the vehicle creep torque will be available from the powertrain. The creep torque will move the vehicle forward without advancing the accelerator pedal. The presence of the creep torque, even if there could be a small level of vehicle rollback, which happens in a case of an inaccurate gradient estimation, may cause slight vehicle motion. But that can be sufficiently and promptly controlled by most drivers. Driver intuition will help the driver successfully handle this situation. The brake hold function for hill launch assistance/hill hold control thus would give control authority back to the driver by releasing the brake pressure control back to the driver's input level as soon as powertrain torque will be available and sufficient for vehicle launch purposes.

SUMMARY

The present invention comprises a brake-based vehicle hill-start assistance function that will solve the problem of road grade level vehicle hill launch assistance. The control objective is to keep the vehicle at standstill before engine startup and to enable prompt vehicle launch performance once the powertrain is ready to deliver driving torque to the vehicle traction wheels.

The brake-based control can be applied when the estimated road gradient is in a low level range. Further, a brake pressure release decision is made based on powertrain state and engine speed rather than estimated powertrain torque output.

The brake-based control, which can be identified by the name Wheel Torque Disturbance Suppression (WTDS), is an open loop brake control function that can be used for initial combustion torque mitigation, which avoids powertrain torque oscillations during engine startup by keeping the brakes applied. The control uses WTDS control logic for low road gradient vehicle hold purposes for hybrid vehicles that use an engine stop-start strategy. Reference may be made to pending U.S. Published patent Application No. 2010/0305790 A1 published Dec. 10, 2010, filed May 28, 2009, and titled "Wheel Torque Disturbance Suppression" for a description of WTDS control. That application is assigned to the assignee of the present invention.

The present invention further comprises a method for preventing a micro-hybrid vehicle from motion before engine startup using automatic engine stop-start strategy during a driving event. The method includes using a driver activated service brake that builds up and/or maintains brake pressure during an engine-off state when the vehicle is stopped. Further, the method solves a powertrain torque spike problem observed in a micro-hybrid vehicle system during engine startup by applying brake based technology.

Engine torque transients during engine cranking cause engine speed irregularities. The method of the invention may use peak engine speed when these irregularities occur. A detection of the peak engine speed may be used to trigger a brake release. Detection of an instant when engine speed crosses a pre-calibrated threshold also can be used to trigger a brake release during engine cranking. Further, a change in engine speed at a pre-calibrated rate during engine cranking could be used to trigger a brake release as the vehicle powertrain transitions from an engine cranking mode directly to a launch mode. Still further, detection of an engine speed that is above a pre-calibrated threshold for a pre-calibrated time can be used to trigger a brake release.

The method of the invention avoids a late brake release, which could drag the vehicle launch. It also avoids an early brake release, which could cause a perceptible torque "bump."

Although the embodiment of the invention herein described uses pressure-operated wheel brakes to obtain friction brake torque, the invention could instead use electric brakes to develop brake torque at the wheels. The control variable used to initiate a hill hold function then could be brake actuator current, for example, rather than brake pressure.

If the roadway gradient is greater than the pre-determined value, estimated powertrain torque, as well as engine speed, could be useful to determine a time to release the brake during cranking. When the gradient is greater than 7%, for example, the hill hold feature will stay applied when the driver releases the brake pedal until powertrain torque is greater than gradient torque, or until the accelerator pedal is advanced and the engine speed is higher than a threshold value. This is because the more the road gradient, the more the delay will be in a vehicle launch. Thus there will be more time for engine torque irregularities to converge to an accurate torque value at the end of the cranking phase. This allows for more time for an accurate estimated powertrain torque to develop.

BRIEF DESCRIPTION OF THE DRAWINGS

FIGS. 1a-1i are time plots of engine characteristics, vehicle speed, acceleration and brake pressures during a vehicle hold event;

DETAILED DESCRIPTION

Figure 2:
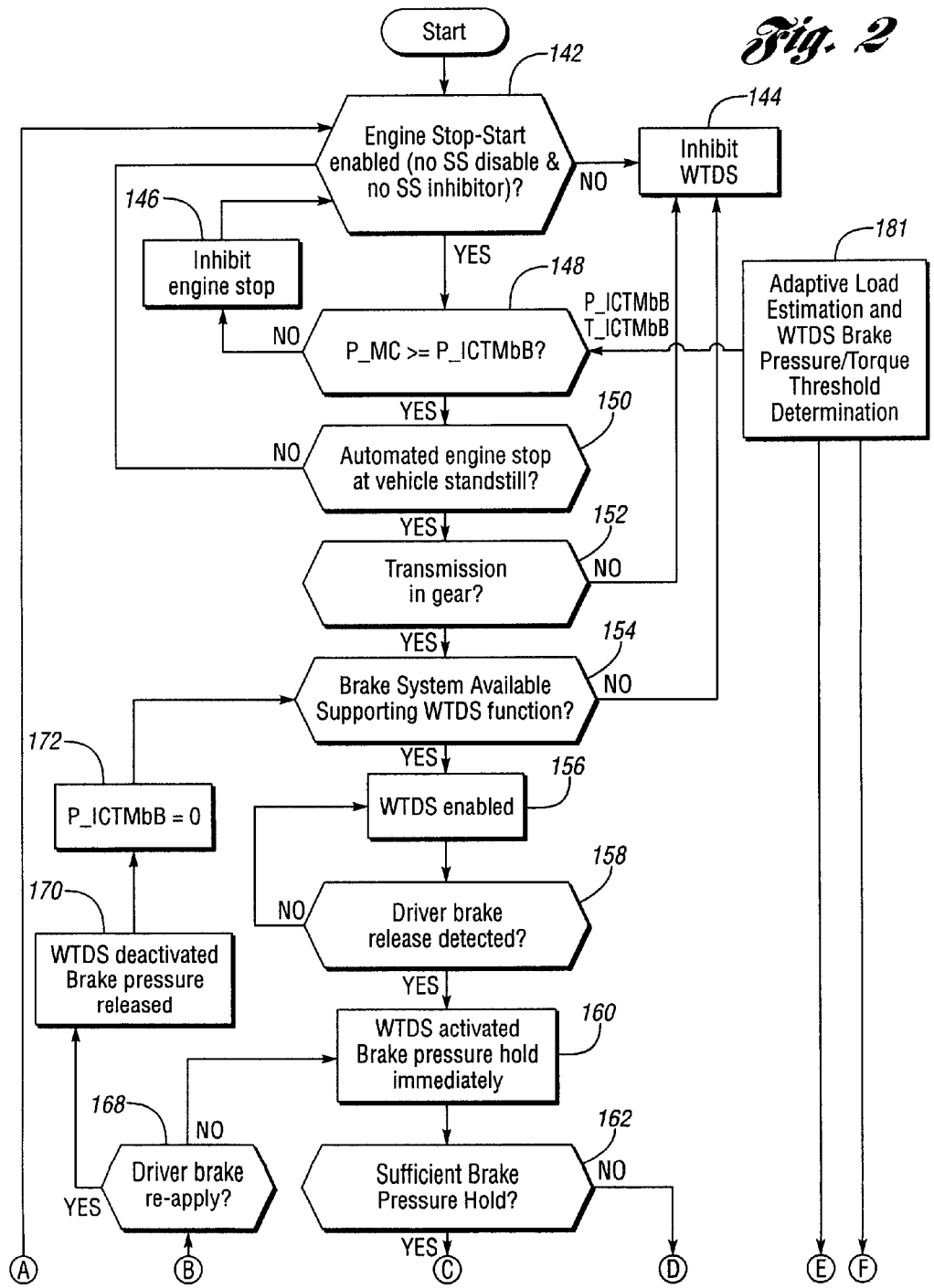
FIG. 2 is a logic flow chart for a vehicle hold assistance feature.
Figure 2:
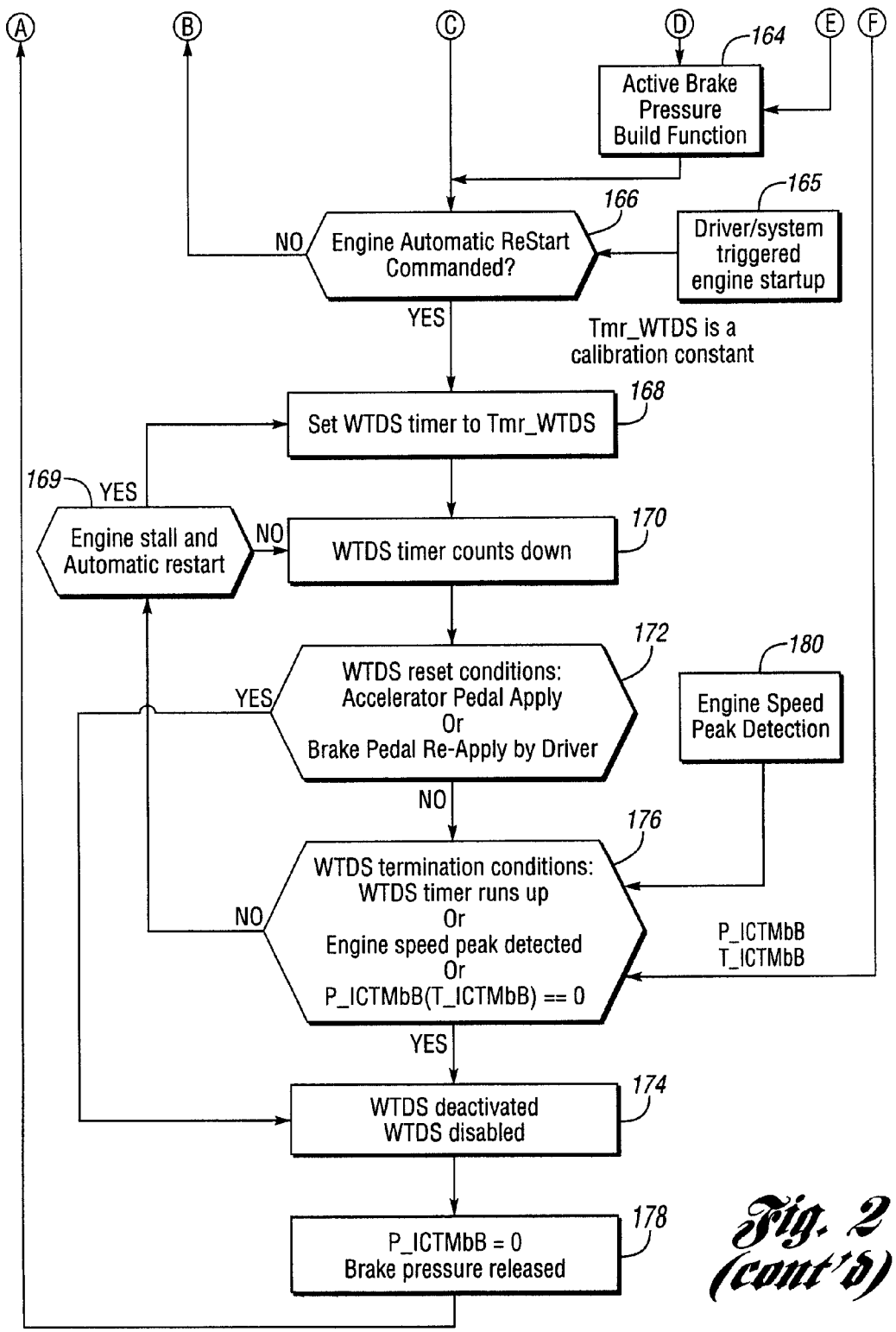

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The WTDS brake-based control supports the stop and start performance associated with a micro-hybrid vehicle by holding the vehicle on a gradient and preventing undesired motion using a hydraulic brake system (foundation brake system). It is an open loop system that provides an ability to hold the brake pressure to a level that is either calibrated or determined adaptively to be sufficient for an engine startup torque spike suppression. This is a passive control and the assumption behind it is that the original driver brake pressure input is higher than the brake-based hold pressure. For this reason, the engine shutdown entry condition has to assume the same pressure threshold. That is, the engine shutdown will not be commanded if the driver does not apply sufficient brake pedal input such that the brake master cylinder pressure is higher than the brake-based hold pressure.

Given sufficient high brake line pressure, the brake reaction torque will be able to hold the vehicle wheels from any motion caused by disturbance torque at the wheels. The brake action actually isolates the undesirable powertrain disturbance torque from the vehicle. The brake pressure may be released, according to one feature of the invention, when an engine speed peak is detected and passed. A brake release may be released also when engine speed increases in the engine cranking mode at a calibrated rate or when engine speed is greater than a calibrated threshold. As the brake pressure ramps down and the powertrain torque increases, vehicle creep or drive-off (launch) will take place in response to a driver's accelerator pedal command. The overall engine automatic startup process during vehicle start will be smooth and comfortable compared to a conventional vehicle (no stop/start function). The brake pressure hold function will be terminated immediately in the presence of accelerator pedal apply or brake pedal-reapply.

The brake pressure vehicle-hold function is expected to hold the vehicle from motion before the engine startup but after the driver releases the brake pedal. It also enables vehicle creep motion as soon as the engine begins its start cycle so that it is ready to supply driving torque. For road gradients higher than 7%, it is assumed that the normal vehicle hold function will assist the vehicle launch process. The WTDS function will only be activated/enabled when there is an engine stop in the transmission Drive range and the service brake system is unavailable to support the brake hold function.

Figure 3:
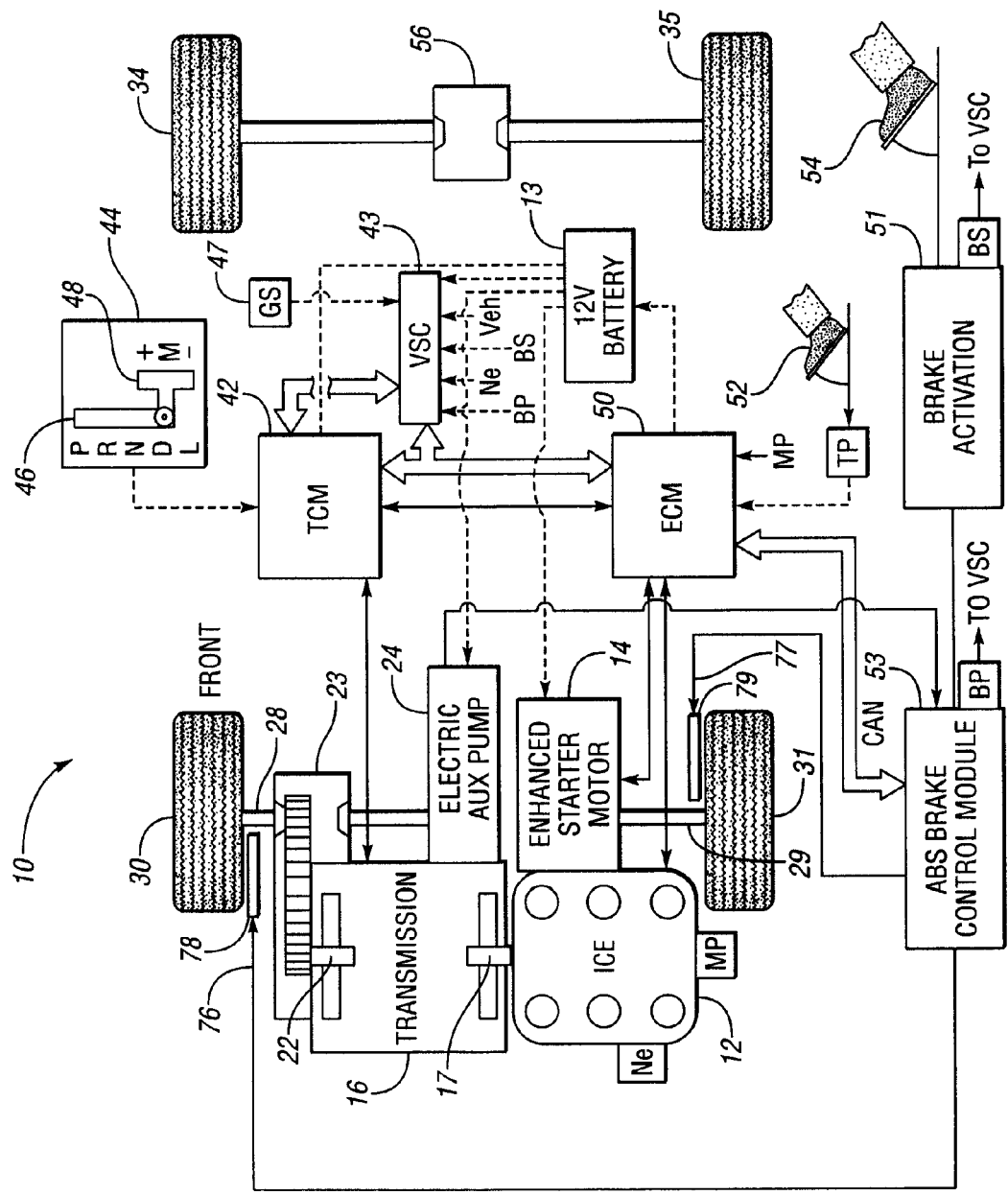
FIG. 3 is a schematic representation of a micro-hybrid electric vehicle powertrain capable of embodying the invention.

FIG. 3 is a schematic drawing of a micro-hybrid vehicle system 10 that may incorporate the invention. It includes an engine 12 that may be drivably coupled during engine starting to an enhanced engine starter motor 14, which may be selectably clutched to the engine crankshaft 17. Torque from engine 12 is delivered through transmission 16 and transmission torque output shaft 22 to a torque transfer unit and vehicle traction wheels 30 and 31. Differential 23 divides engine torque delivery to axle half shafts 28 and 29. A battery 13 powers the starter motor and an electrically driven pump 24, which supplies wheel brake pressure for a brake hold function. Transmission ratio ranges are manually selected by shift lever system 44 with automatic ratio range features at 46 and a ratio range selector at 44. Ratio ranges are delivered to module 42.

An engine control module 50 controls engine 12 and motor 14. Brake pedal 54 and a brake activation system 51 provide driver brake signals to an automatic brake control module 53 for wheel brakes 78 and 79. Brake pressure flow paths from pump 24 and the brake pressure control module 53 to the wheel brakes are shown at 77 and 76. A vehicle system controller 43 (VSC) provides supervisory control of modules 42, 50 and 53 using a control area network CAN. Brake activation system 51 provides a brake state signal (BS) to the VSC and module 53 provides a brake pressure signal (BP) to the VSC. It also controls pressure delivery of brake cylinder pressure from pump 24 and brake cylinder pressure developed by driver input at 54.

A gradient sensor 47 provides gradient data to vehicle system control 43. Sensor 47 may determine a road gradient using, for example, an accelerometer that provides a readout based in part on a gravity force component, or on data using an inclinometer.

The system of the invention holds the vehicle wheels and prevents the vehicle from moving before the engine startup using its ability to hold the brake pressure once driver brake release is detected. The hold pressure level is expected to be as close to the original driver brake input before release as possible. It also has to be higher than a level of master brake cylinder pressure that is either calibrated or adaptively determined for other brake based control purposes, e.g. initial combustion torque mitigation. This is depicted as a Phase A section in FIGS. 1a-1i.

The system can be designed with a passive brake pressure hold function. The assumption behind this is that the original driver brake pressure input is sufficient to hold the vehicle in standstill in an absence of powertrain creep torque. It can also involve an active brake pressure build function in the case in which the brake pressure hold level is insufficient to achieve vehicle hold at standstill. Given sufficient high brake line pressure, the brake static reactive friction torque will be able to isolate the vehicle from the road gradient load and other disturbance torque on the vehicle. As a result, the vehicle is kept in standstill before the engine is being started.

The brake pressure release will be determined based on certain engine startup powertrain timing. The brake release is requested; i.e. the system is set to inactive, when a certain powertrain state condition is satisfied. The engine speed signal is used as the powertrain state indicator. The engine speed signal is both low pass filtered and high pass filtered to get a relatively smooth engine speed signal and its derivative. The brake release is activated when an engine start flag is seen, which is determined by either condition 1 or condition 2 listed below:

Condition 1: A certain engine speed threshold has passed and engine startup speed peak has been detected.

Condition 2: A certain high engine speed threshold has been passed for a certain calibration time duration as well as a certain level of calibrated engine speed gradient.

Besides normal brake pressure release conditions, the following conditions are also used for making brake pressure release decision:

Condition 3: Driver brake re-apply detected.

Condition 4: Accelerator pedal motion detected.

Condition 5: WTDS timer expired.

If any of these brake pressure release conditions is satisfied, brake pressure will be released immediately to zero or to a current driver brake input pressure level to give the control authority back to the driver. The system only functions during engine startup up to a predetermined time period (Condition 5). In the case in which the engine does not startup correctly, a timer setting will be extended to keep its responsibility if a failed engine startup is followed immediately by an automatic engine restart attempt. After a certain predetermined number of attempts to restart, the system will be disabled if the engine does not work properly.

After brake pressure release is commanded, vehicle creep or drive-off (launch) will be exhibited according to a driver's accelerator pedal command as the brake pressure ramps down and the powertrain torque increases. The overall engine automatic startup process during vehicle start will be smooth and comfortable compared to a conventional vehicle (no stop/start function). During a starting maneuver, the brake force can neither be reduced too early, whereby possible road gradient load may roll the vehicle backward, nor too late, whereby loss of drivability and degraded performance will be the result as the brake force drags the vehicle from driving-off. The WTDS use case for vehicle hold is illustrated in FIGS. 1a-1i. The control logic for vehicle hold is shown in FIG. 2.

In an alternative vehicle hold control system to keep the vehicle in standstill before the engine startup in drive, transmission tie-up technology can be applied to achieve the same function to assist vehicle hold given that the transmission tie-up release will be based on the Condition 1 and Condition 2 stated before.

The brake based vehicle hold control strategy has the following advantages over the alternative system:

1. Brake system has high friction force capacity and longer durability of friction materials. It is possible for a transmission tie-up mechanism to be damaged in a heavy vehicle loading condition. The replacement and cost to change a faded brake friction pad is much less costly than the cost of transmission control components.

2. The brake based method basically satisfies the control requirement by taking advantage of the initial driver brake input. It is not necessary to actively build pressure to that pressure required in a transmission control device.

3. The proposed brake based method consumes very little energy for electromagnetic brake valves during its passive brake pressure hold function in comparison to the energy consumption for pump operation in a transmission based solution.

FIGS. 1a through 1h show time plots for a wheel torque disturbance suppression function for a micro-hybrid electric vehicle hold function during an engine startup when the vehicle is on a road gradient of about −3% to approximately 7%. The time plots are made with time intervals A, B, and C.

As shown by plot 60 the brake pedal is released at 62 and the brake pedal pressure decreases to a near 0 value at 64 after the engine start function is ended. The engine start is triggered at time 62 and continues until time value 66 when the brakes are released. The driver selected ratio range remains constant, as shown at 68, from the beginning to the end of section B where the engine start is triggered. At a later time an accelerator pedal is advanced to create an increasing accelerator position plot 70.

Preconditions that exist before initiation of the vehicle hold feature include a stopped engine, a closed driver door, a released park brake, a released accelerator pedal, standstill of the vehicle, application of the brakes, and a position of the ratio selector indicates that the vehicle is in Drive.

FIG. 1b demonstrates the change in brake line pressure and master cylinder brake pressure. Before the driver brake release is detected, a pressure hold at 70 is higher than the driver brake pressure input level shown at 72 in FIG. 1b. The level 72 is sufficient to prevent vehicle roll back. If the brake line pressure drops to a level that is insufficient for vehicle hold purposes as shown at 74, an active brake pressure buildup trajectory using a pressure source (electric auxiliary pump 24) as shown at 76, until a value shown at 78 is reached. When the engine start is complete, the wheel torque hold feature is inactive as shown at 80.

FIG. 1c shows the WTDS hold feature status after the driver brake release is detected and the brake pressure hold begins. The brake is released at 86. The hold feature is inactive, as shown at 90, after the engine start-up at or after the WTDS timer runs out as shown at 88. The hold feature will not be enabled if no engine stop has been experienced or the transmission is not in gear during an engine start-up.

FIG. 1d shows a WTDS timer status. The timer set time is zero initially, as shown at 92. The timer may be set to a value as shown at 94. After engine start-up is detected, the brake pressure drops immediately irrespective of the WTDS timer status. This is shown at 95. The timer can then be reset after being inactive. When the engine start is triggered, the timer runs down to the level shown at 96. Stepped plot 98 illustrates the timer run-down.

FIG. 1e is a time plot of changes in vehicle speed. When the engine start is triggered at time B in FIG. 1e, the vehicle speed increases because of vehicle creep as shown at 102. This increase may continue until a vehicle launch is made at 104.

FIG. 1f shows the trigger points where engine start is requested. An engine start/stop scheduler changes from an engine stop state 106 to an engine start state 108.

FIG. 1g shows an engine speed plot at the beginning of a launch. Idle speed in FIG. 1f is shown at 110. Engine cranking begins at the end of time A. Combustion torque transients during the cranking mode are shown at 112. The transients continue until the end of time B. A peak engine speed is reached at 114. The engine speed will eventually decrease, as shown at 116, until the idle speed is reached at 118 when the creep mode is in effect. Following the creep mode, a launch occurs as shown at 120.

The brake release flag is set and the braking function is set to an inactive state when a certain powertrain state condition is satisfied. The engine speed signal is used as a powertrain state indicator. The brake release is activated when an engine started flag is set, which is determined by either of the following two conditions. First, a certain engine speed threshold has been passed and the engine start-up speed peak is detected at 114. Second, a certain high engine speed threshold has been passed for a certain calibratable time duration. The engine speed signal is both low pass filtered and high pass filtered to get relatively smooth engine speed signals and the derivative of the signals, which indicates a rate of change of the engine speed.

FIG. 1h shows a crankshaft torque at the wheels brake torque and road load at the wheel throughout the vehicle hold engine start-up event. Brake torque is shown at 122, wheel torque is shown at 124, and engine torque at the wheels is shown at 126. Brake torque after an engine start is shown at 128. The plot at 124 is equal to the algebraic sum of the plot at 128 and the plot at 126.

The plot in FIG. 1h assumes that the transmission is engaged in gear during the engine start-up process.

The engine is running between time B and the end of time C. Before time B, the engine is off. There may be about a 300-500 millisecond delay in delivering wheel creep torque. The delay depends on how fast the engine can be started up. This is illustrated by the dotted line oval at 130 in FIG. 1h. The crank torque at the wheels peaks, as shown at 132, when time B is reached. This corresponds approximately to a peak negative brake torque as shown at 134.

FIG. 1i shows the time values for the various engine start-up flags. The start-up flag during engine starting occurs at 136. An engine start flag is shown at 138 and an engine running flag is shown at 140.

In FIG. 1b, it is seen that an active pressure build-up will occur when the driver releases the brake pedal too quickly. When that occurs, as previously described, there is an active pressure build-up supplied by an auxiliary pump, which supplies more pressure to maintain a sufficient pressure to keep the vehicle from rolling back.

FIG. 2 is a flowchart that demonstrates the steps followed during the engine start-up events that occur as shown in FIGS. 1a through 1i. At the start of the routine of FIG. 2 entry conditions are established at 142. If no engine stop state occurs at 146 due to a master brake cylinder pressure being less than the initial combustion torque mitigation pressure (hold pressure) as shown at step 148, the routine will proceed to the step 150 where it is determined whether automatic engine stop and vehicle standstill are in place. If they are not, the routine will not continue. If the inquiry at 150 is positive, a decision is made at step 152 as to whether the transmission is in gear. If it is not, the braking function will be inhibited as shown at 144. If the inquiry at 152 is positive an inquiry is made at step 154 regarding whether the brake hold system is available to support the vehicle hold function. If the inquiry is positive, the vehicle hold function is enabled at 156. If it is not available, the routine returns to the beginning The inquiry at 158 determines whether the driver brake release is detected. If the brake remains applied by the driver, the routine will not continue. If the driver releases the brake, the vehicle hold function will be activated as shown at 160. An inquiry is made as to whether the brake pressure is sufficient to hold the vehicle as shown at 162. The active brake pressure build function then begins at step 164. This is graphically illustrated in FIG. 1*b*. Step 162 also is illustrated in FIG. 1*b*.

The step at 164 is an optional step. It is possible for the routine to continue from step 162 directly to the engine automated restart command step at 166.

The step previously discussed at 158 is illustrated graphically in FIG. 1*c*.

The step at 166 determines whether an engine automated restart has been commanded. If it has not been commanded the routine then can return to step 168. It is determined at 168 whether the driver has reapplied the brakes. If he has not, the routine can then continue as previously described. If the driver has reapplied the brakes, the vehicle hold feature will be deactivated, as shown at 170. If the commanded master brake cylinder is zero as detected at 172 the routine then can continue as previously described at step 154.

If the inquiry at step 166 is positive, the timer is set at step 168. This step is illustrated in FIG. 1*d* as previously described.

If the timer counts down as determined at 170, the vehicle hold function reset conditions are tested at 172. It is determined at this step whether the accelerator pedal is applied by the driver or whether the brake pedal reapply has been initiated by the driver. If neither of these conditions is present, the routine will proceed directly to step 176 where it is determined if the timer runs down or if an engine speed peak is detected, or if the commanded master brake cylinder pressure is zero. If the inquiries at 176 are negative, an automatic engine restart is attempted at 169 if the engine has stalled.

If the inquiries at 172 are positive, the routine can proceed directly to steps 174 and 178. Upon a brake release determined at 178, the routine can return to the beginning A detection of an engine speed peak as indicated at 180 will result in an immediate termination of the previously described brake hold conditions, as shown at 176.

An adaptive load estimation and wheel brake pressure and torque threshold determination are made at 181. This is illustrated by line 182 in FIG. 1*b*. The brake pressure threshold is used at step 164 to signal a build-up of brake hold pressure as shown at 76 in FIG. 1*b*. The conditions that will terminate the brake hold feature are: the timer is reset, or an engine speed peak is detected during cranking, or the master brake cylinder pressure 182 in FIG. 1*b* falls to zero as the brake is released.

OVERVIEW

The disclosed embodiment of the invention includes a method for preventing micro-hybrid vehicle motion before engine startup using an automatic engine stop-start function during a driving event. The method uses a driver operated service brake to build up and/or maintain brake torque during an engine off state when the vehicle is stopped.

The disclosed embodiment of the invention applies a brake torque hold/build function at a torque level higher than the actual driver's brake torque input.

The disclosed embodiment of the invention uses the brake torque hold/build function after detecting driver brake release.

The disclosed embodiment enables the brake torque hold/build function after detecting an engine stop in drive when the vehicle is in standstill and the estimated road gradient is in a low gradient range (−3%~7%).

The disclosed embodiment uses engine speed to make brake release decisions after the engine is commanded to start in Drive.

The brake hold is further coordinated with the engine startup process such that the function extends to a case where possible engine startup fails.

Although an embodiment of the invention has been disclosed, it will be apparent to persons skilled in the art that modifications may be made without departing from the scope of the invention. All such modifications and improvements therein are covered by the following claims.

What is claimed is:

1. A method for controlling a vehicle having an engine, wheel brakes, and a controller configured to perform the method, comprising:
   stopping the engine with the vehicle stopped on a surface with a gradient;
   maintaining the wheel brakes applied during an engine automatic restart; and
   lowering fluid pressure applied to the wheel brakes to release the wheel brakes during the engine automatic restart in response to detecting an engine speed peak and a predetermined engine speed.

2. The method of claim 1 wherein maintaining the vehicle wheel brakes applied comprises increasing the fluid pressure applied to the wheel brakes for a predetermined brake pedal position after a brake pedal is released.

3. The method of claim 1 wherein the vehicle includes a starter motor and wherein:
   stopping the engine comprises stopping the engine in response to application of the wheel brakes; and
   maintaining the wheel brakes applied comprises maintaining the wheel brakes applied while the starter motor is cranking the engine during the engine automatic restart when the gradient is within a predetermined range.

4. The method of claim 1 wherein lowering the fluid pressure applied to the wheel brakes to release the wheel brakes further comprises releasing the wheel brakes in response to at least one of depressing a brake pedal, depressing an accelerator pedal, and expiration of a calibrated time following brake application during the engine automatic restart.

* * * * *